United States Patent
Schwarz et al.

[11] Patent Number: 5,644,081
[45] Date of Patent: Jul. 1, 1997

[54] MICROACCELEROMETER PACKAGE WITH INTEGRAL SUPPORT BRACES

[75] Inventors: Dwight Lance Schwarz, Kokomo; William Martin Maki, Ft. Wayne; Richard Allen Wilson, Kokomo, all of Ind.

[73] Assignee: Delco Electronics Corp., Kokomo, Ind.

[21] Appl. No.: 535,679

[22] Filed: Sep. 28, 1995

Related U.S. Application Data

[63] Continuation of Ser. No. 220,864, Sep. 28, 1995, abandoned.

[51] Int. Cl.$^6$ ................................................. G01P 1/02
[52] U.S. Cl. ................................................. 73/493
[58] Field of Search ........................... 73/493, 497, 431, 73/866.5, 756, 514.16

[56] References Cited

U.S. PATENT DOCUMENTS

| | | | |
|---|---|---|---|
| 4,700,973 | 10/1987 | Gademann et al. | 73/493 |
| 5,233,871 | 8/1993 | Schwartz et al. | 73/493 |
| 5,233,873 | 8/1993 | Mozgowiec et al. | 73/493 |
| 5,303,589 | 4/1994 | Reidemeister et al. | 73/497 |
| 5,345,823 | 9/1994 | Reidemeister et al. | 73/497 |
| 5,457,991 | 10/1995 | Nishizawa | 73/493 |
| 5,503,016 | 4/1996 | Koen | 73/493 |
| 5,528,935 | 6/1996 | Welch et al. | 73/493 |

FOREIGN PATENT DOCUMENTS 0521 335 A1  7/1993  European Pat. Off. .

*Primary Examiner*—Hezron E. Williams
*Assistant Examiner*—Helen C. Kwok
*Attorney, Agent, or Firm*—Mark A. Navarre

[57] ABSTRACT

A microaccelerometer package is provided for housing a microaccelerometer and its associated signal conditioning circuitry. The microaccelerometer package is constructed to be suitably rugged for use in on-board automotive safety control and navigational systems, so as to be capable of isolating the microaccelerometer from extraneous vibrations and package-induced stresses, yet also be small, lightweight, and amenable to mass production techniques. To achieve the above, the microaccelerometer package employs a leadframe which is initially a one-piece strip frame that is integrally molded with a plastic housing to form the primary structure of the package. The leadframe enhances the rigidity of the package so as to result in a high natural frequency of the package, thereby enabling the microaccelerometer to properly respond to the frequency range of interest, while also minimizing the influence of extraneous road and vehicle vibrations on the microaccelerometer. Use of the leadframe also results in a compact microaccelerometer package that imposes minimal package-induced stresses on the microaccelerometer. As a result, a more reliable signal output is provided by the microaccelerometer for indicating an automobile's acceleration or deceleration.

3 Claims, 2 Drawing Sheets

MICROACCELEROMETER PACKAGE WITH INTEGRAL SUPPORT BRACES

This is a continuation of application Ser. No. 08/220,864 filed on 28 Sep. 1995 now abandoned.

This invention generally relates to microaccelerometers, such as those which sense deceleration for the purpose of deploying a supplementary inflatable restraint in an automobile. More specifically, this invention relates to a microaccelerometer package having enhanced rigidity and stress isolation characteristics, yet requires a minimal number of components which must be assembled to form the microaccelerometer package, so as to provide a very small package which can be readily assembled at relatively low cost.

BACKGROUND OF THE INVENTION

An accelerometer is one of the primary sensors used in on-board automotive safety control systems and navigational systems, particularly crash sensing systems. Examples of such automotive applications include anti-lock braking systems, active suspension systems, supplemental inflatable restraint systems such as air bags, and seat belt lock-up systems. An accelerometer is a device which measures acceleration, or more accurately, the force that is exerted by a body as the result of a change in the velocity of the body. A moving body possesses inertia which tends to resist the change in velocity. It is this resistance to any change in velocity that is the source of the force which is exerted by the moving body. This force is directly proportional to the acceleration component in the direction of movement when the moving body is accelerated.

In the past, electromechanical and electronic accelerometers have been widely used in the automotive industry to detect an automobile's deceleration. More recently, micromachined accelerometers which employ piezoresistive microbridges have been used. Such accelerometers detect acceleration in the plane perpendicular to a plane through a proof mass and the microbridge which supports the proof mass. Acceleration and deceleration of the vehicle cause a compressive or tensile load on piezoresistive elements embedded in the microbridge which supports the proof mass, depending on which direction the acceleration or deceleration is applied within that plane. It is the accelerating force on the support system for the proof mass, and the proof mass inertia, which generates compressive or tensile loads on the piezoresistive elements. In turn, the resulting compressive and tensile loads change the electrical resistance of the piezoresistive elements embedded in the microbridge. This change in electrical resistance can be sensed to determine the magnitude of the acceleration component perpendicular to the plane of the common axis shared by the piezoresistive elements.

Piezoresistive accelerometers are capable of extremely precise measurements, and are therefore desirable for use in automotive applications. However, they must be adequately packaged to protect the micro-machined accelerometer from an automobile's harsh environment. In particular, the accelerometer must be isolated from the mechanical stresses with its mounting package, and reasonably isolated from the extraneous road and vehicle vibrations during use. For example, the packaging for the accelerometer must be sufficiently rigid such that its resonant frequency lies above the frequency range to be detected. An accelerometer intended to detect acceleration or deceleration of a vehicle would require that it be insensitive to jarring of the vehicle due to rough road surfaces, low speed collisions, and the like.

The accelerometer's packaging must also isolate the accelerometer from the harsh automotive environment, such as salt, grease, dust and moisture, yet be easy to assemble in order to reduce material and assembly costs, such that the accelerometer package is amenable to high volume, low cost automotive production techniques. The above features are complicated by the desire for accelerometer packaging to be small and compact, while also providing an inert protective atmosphere for the micro-machined accelerometer. One approach has been to form the accelerometer package by overmolding the accelerometer with a suitable plastic material. However, a drawback of this approach is the significant package-induced stresses which are created as a result of the different coefficients of thermal expansion for the materials used.

An accelerometer package which overcomes the above shortcoming is taught by U.S. Pat. No. 5,233,871 to Schwarz et al., assigned to the assignee of this invention. Schwarz et al. teach a microaccelerometer package in which a micromachined accelerometer and its associated signal conditioning and processing circuitry are packaged within a three piece housing in a manner which minimizes space requirements, yet does not involve overmolding the accelerometer. The accelerometer and the signal processing circuitry are positioned and secured relative to each other on a pair of recessed surfaces within the package, such that each is rigidly secured to the package and is isolated from extraneous vibrations which are transmitted to the package from the environment. During processing, the signal processing circuitry advantageously remains accessible for final trimming and tuning procedures prior to sealing the package. The accelerometer and the signal processing circuitry are also positioned relative to each other so as to minimize the length of the electrical conductors required to electrically connect them, which facilitates automated procedures for attaching the electrical conductors to their wire bond sites.

Though the packaging taught by Schwarz et al. provides a small compact assembly which is amenable to automotive production techniques, it would be highly desirable if further reductions in packaging size and manufacturing complexity and costs could be achieved. Therefore, it would be advantageous to provide a microaccelerometer package whose construction is able to substantially isolate its micromachined accelerometer from extraneous vibrations and package-induced stresses. In addition, it would be desirable if the package were rigid and required a minimal number of components so as to facilitate its assembly, and therefore minimize assembly costs. Furthermore, it would be desirable if the size of the support structure for mounting the package within its environment could be reduced, so as to minimize the overall size of the package.

SUMMARY OF THE INVENTION

It is an object of the present invention to provide a cost-efficient microaccelerometer package which is suitable for use in automotive applications while also being amenable to automotive production techniques.

It is another object of this invention that such a microaccelerometer package employ a housing in which both a microaccelerometer and the signal processing circuitry necessary to condition the output signal of the microaccelerometer can be enclosed.

It is a further object of this invention that the microaccelerometer package be capable of isolating the microaccelerometer from extraneous vibrations and package-induced stresses, while also being small and lightweight.

It is still a further object of this invention that such a microaccelerometer package be formed with an electrically conductive frame structure which forms the connector pins and bond sites for the accelerometer and the signal processing circuitry, while also promoting the structural rigidity of the package.

It is yet another object of this invention that the frame structure form braces which are configured to support the microaccelerometer package and also serve as an electrical ground for the package.

In accordance with a preferred embodiment of this invention, these and other objects and advantages are accomplished as follows.

A microaccelerometer package is provided for housing a microaccelerometer and its associated signal conditioning circuitry. The microaccelerometer package is constructed to be suitably rugged for use in on-board automotive safety control and navigational systems, so as to be capable of isolating the microaccelerometer from extraneous vibrations and package-induced stresses, yet also be small, lightweight, and amenable to mass production techniques. To achieve the above, the microaccelerometer package employs a leadframe which is initially a one-piece strip frame that is integrally molded with a plastic housing to form the primary structure of the package. The leadframe enhances the rigidity of the package so as to result in a high natural frequency of the package, thereby enabling the microaccelerometer to properly respond to the frequency range of interest, while also minimizing the influence of extraneous road and vehicle vibrations on the microaccelerometer. Use of the leadframe also results in a compact microaccelerometer package that imposes minimal package-induced stresses on the microaccelerometer. As a result, a more reliable signal output is provided by the microaccelerometer for indicating an automobile's acceleration or deceleration.

The microaccelerometer package generally includes the plastic housing, the leadframe which is integrally molded with the housing, a cover, and mechanical braces for supporting the package. A cavity is formed in the housing to receive the microaccelerometer and its associated signal processing circuitry. The leadframe is formed from an electrically conductive material, and is composed of several separate portions which originally formed a unitary strip frame at the time the leadframe was molded with the housing. As finished, the leadframe is composed of separate portions, one of which primarily serves a structural function while the other primarily serves an electrical function. The structural portion of the leadframe forms a backplate for supporting the microaccelerometer and signal processing circuitry within the cavity of the housing. The structural portion of the leadframe also projects from the housing so as to form the mechanical braces which enable the package to be rigidly mounted to the vehicle. The braces serve to enhance the rigidity of the microaccelerometer package, while also serving as a ground for the microaccelerometer and the signal processing circuitry. The electrical portion of the leadframe is composed of a number of leads which project from the housing, and form input/output pins or terminal blades for the package as well as internal bond sites for the electrical conductors which electrically interconnect the microaccelerometer and the signal processing circuitry with the input/output leads. The cover serves to enclose and seal the signal processing circuitry and the microaccelerometer within the housing and from the automotive environment.

The microaccelerometer and the signal conditioning circuitry are preferably adhered directly to the backplate with a resilient material which minimizes the transfer of package stresses to the microaccelerometer and the signal conditioning circuitry. In the preferred embodiment, the microaccelerometer is a micro-machined all-silicon accelerometer, and the signal processing circuitry is a programmable silicon semiconductor chip. Several of the leads which extend through a wall of the housing serve to transmit the microaccelerometer's conditioned signal from the signal processing circuitry to the associated automotive system, such as a supplemental inflatable restraint system, an anti-lock braking system, an active suspension system, or a seat belt lock-up system. Several other leads are available through which calibration can be performed on the signal processing circuitry after the package is fully assembled.

A particularly advantageous feature of this invention is that the leadframe serves a dual purpose. The leadframe forms the leads by which the output of the microaccelerometer is transmitted from the microaccelerometer package to its associated vehicle system. In addition, the leadframe also forms an integral structural member of the package which significantly increases the rigidity of the package, and therefore the accuracy and reliability of the output signal. As a result, additional structural components which must be assembled with the package are not required. In addition, the rigidity of the package is particularly enhanced because the leadframe is formed from metal, which also allows the braces to serve as an electrical ground for the package.

Another distinct advantage of the present invention is that the size of the microaccelerometer package and the cost to produce the package are both minimized due to the package being composed essentially of the overmolded leadframe. In addition, this minimizes the costs associated with the assembly of the microaccelerometer. No additional structural components are required which would otherwise undesirably contribute to the size of the microaccelerometer package, as well as complicate the assembly of the package and increase the cost of the package. Yet, the microaccelerometer package is constructed in a manner which substantially isolates the microaccelerometer from extraneous vibrations and package-induced stresses, such that the microaccelerometer is capable of properly sensing the automobile's acceleration or deceleration. Such advantages are particularly desirable for use in a hostile automotive environment.

Other objects and advantages of this invention will be better appreciated from the detailed description thereof, which follows.

BRIEF DESCRIPTION OF THE DRAWINGS

The above and other advantages of this invention will become more apparent from the following description taken in conjunction with the accompanying drawings wherein.

DETAILED DESCRIPTION OF THE PREFERRED EMBODIMENTS

Figure 1:
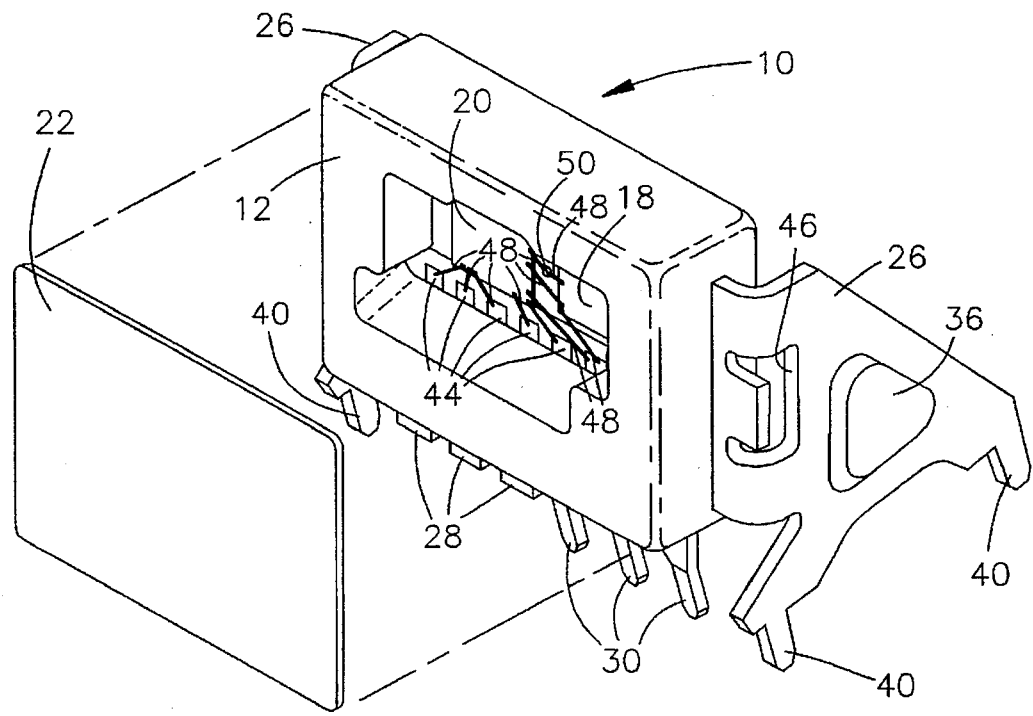
FIG. 1 is a perspective view of a microaccelerometer package in accordance with a preferred embodiment of this invention.

With reference to FIG. 1, a microaccelerometer package 10 is shown which houses a microaccelerometer 18 and its associated signal processing circuitry 20. As will become apparent, the package 10 is particular suitable for use in on-board automotive safety control and navigational systems, such as a supplemental inflatable restraint system, an anti-lock braking system, an active suspension system, or a seat belt lock-up system. Those skilled in the art will appreciate that other applications for the microaccelerometer package 10 are entirely foreseeable.

The microaccelerometer package 10 generally includes a housing 12 in which a recess 14 is formed for receiving the microaccelerometer 18 and the signal processing circuitry 20, and a pair of braces 26 which extend from opposite ends of the housing 12. A pair of feet 40 extend from each of the braces 26 as shown, by which the package 10 can be securely mounted and grounded to a circuit board (not shown). The package 10 also includes a set of input/output terminal blades 30 and programming terminal blades 28 which project through a wall of the housing 12, and a cover 22 which serves to seal the recess 14 and its contents from the surrounding environment. The microaccelerometer 18 and the signal processing circuitry 20 are supported on a backplate 24 which forms a support surface within the recess 14. The housing 12 is preferably formed from an engineering plastic, such as a 30% glass-filled polyester, while the cover 22 may be formed from a suitable material, such as mylar or other plastic material or a light weight metal, such as an aluminum alloy. The backplate 24, the braces 26, and the terminal blades 28 and 30 are all formed from the same electrically-conductive material, which is preferably a corrosion resistant metal such as a nickel-plated steel or a nickel iron alloy.

The signal processing circuitry 20 is preferably a programmable silicon semiconductor chip, although other techniques could also foreseeably be used. The microaccelerometer 18 is preferably a bulk micro-machined accelerometer which employs a cantilevered proof mass (not shown) which operates on the piezoresistive effect, though it is foreseeable that other microaccelerometer designs could be employed. The micro-machined accelerometer is preferably a three-layer all-silicon structure which is bonded together using a combination of silicon direct bond and glass frit technologies of the type known in the art. However, it is foreseeable that other microaccelerometer designs and technologies could be suitably adapted for use with the package 10 of this invention.

The microaccelerometer unit 18 and the signal processing circuitry 20 are electrically connected to each other and to the terminal blades 28 and 30 with a number of conductors 48. The conductors 48 are preferably formed by known wire bonding techniques, and will typically have a diameter of about 0.04 millimeter. The conductors 48 allow the microaccelerometer's input power and output signal to be transmitted from and to the signal processing circuitry 20 for signal conditioning and processing. The conditioned output signal is then transmitted via conductors 48 to the input/output terminal blades 30 from which the signal can be delivered to the intended vehicle system. Conductors 48 also electrically connect the signal processing circuitry 20 to the programming terminal blades 28, allowing the offset and gain of the signal processing circuitry 20 to be calibrated using known Zener Diode shorting techniques after the package 10 is fully assembled. Conductors 48 also ground both the microaccelerometer 18 and the signal processing circuitry 20 to a ground bond site 50 on the backplate 24.

Figure 2:
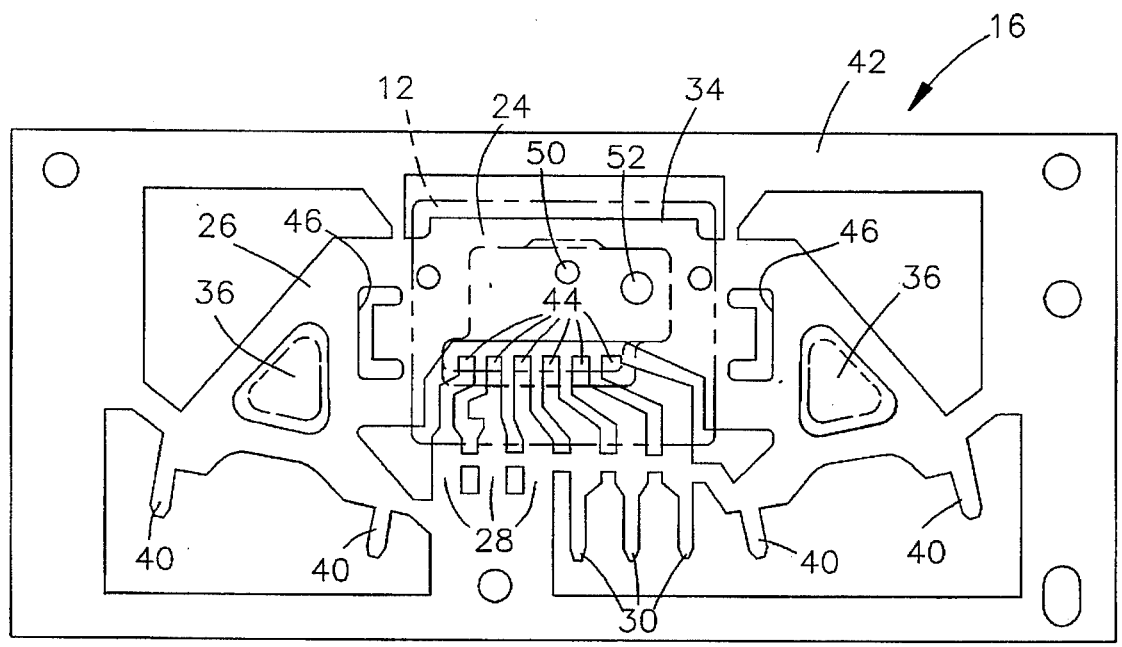
FIG. 2 is a plan view of a leadframe which forms structural and electrical members of the microaccelerometer package of FIG. 1.
Figure 3:
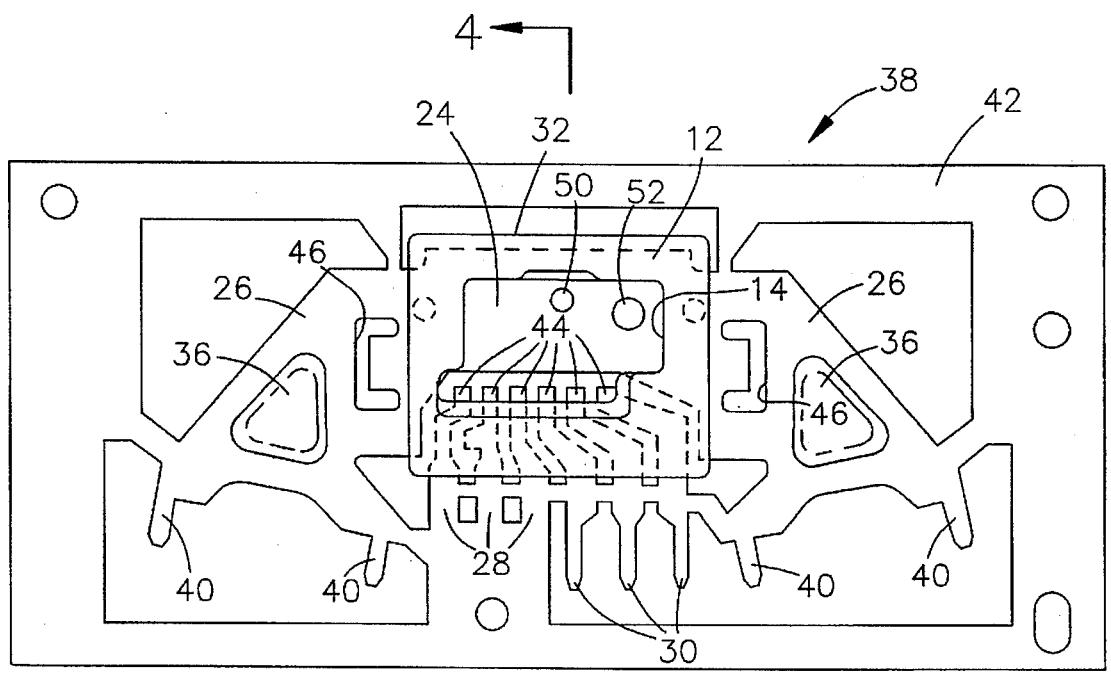
FIG. 3 is a plan view of the leadframe of FIG. 2 after being overmolded to integrally form a housing therewith.
Figure 4:
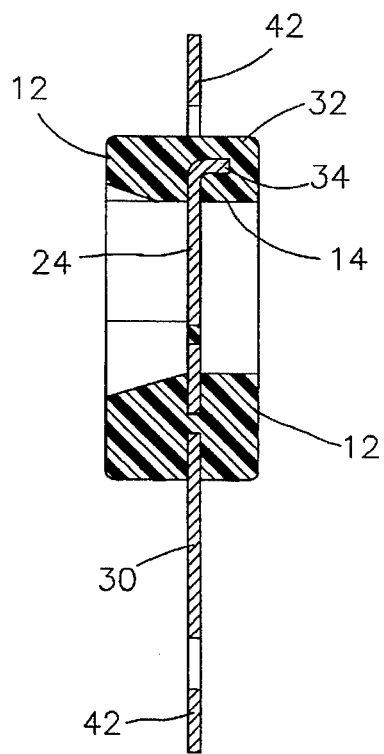
FIG. 4 is a cross-sectional view of the overmolded leadframe of FIG. 3 along line 4—4.

As shown in FIGS. 2 through 4, a preferred aspect of this invention is that the backplate 24, the braces 26, and the terminal blades 28 and 30 are all formed by a single leadframe 16 which is integrally molded with the housing 12. Consequently, assembly of the microaccelerometer package 10 is greatly simplified in that the structural components of the package 10 are formed by only two members, the housing 12 and the leadframe 16. The inherent strength of the leadframe 16 contributes significant rigidity to the package 10, thereby increasing the natural frequency of the package 10 to about 4000 hertz or more. Consequently, the microaccelerometer 18 is substantially unaffected by vibrational noise that would otherwise result in a false vibration signal being generated by the microaccelerometer 18. In addition, the enhanced rigidity of the package 10 reduces the amount of stress transferred to the microaccelerometer 18 if the package 10 is secured to an uneven mounting structure within the automobile.

As best seen in FIG. 2, the leadframe 16 is processed in strip form, and is composed of a frame 42 which supports the structure that will subsequently form the backplate 24, the braces 26 and the terminal blades 28 and 30. The leadframe 16 also forms a flange 34 which projects from one edge of the backplate 24. As shown in FIG. 4, the flange 34 is bent to be roughly perpendicular to the plane of the leadframe 16 in order to contribute greater rigidity to the backplate 24 and the package 10. The rigidity of each brace 26 is preferably enhanced by forming a raised surface or rib 36 therein, as shown in FIGS. 2 and 3. In order to create flat ground tabs for test and calibration purposes, cutouts 46 are formed in each of the braces 26 in the area in which the bend will be formed. Finally, a pedestal or weld button 52 is preferably added to the backplate 24 where the microaccelerometer 18 is to be secured, and projects about 0.4 to about 0.5 millimeter from the surface of the backplate 24 such that the microaccelerometer 18 will be spaced a like distance from the surface of the backplate 24. Though the weld button 52 is not a necessary feature of this invention, it advantageously serves to enhance the isolation of the microaccelerometer 18 from stresses which may be induced through the housing 12 or the backplate 24.

As noted above, the leadframe 16 is integrally molded with the housing 12 to form an overmolded housing and frame assembly 38, shown in FIG. 3. Prior to the molding operation, bond sites are preferably formed on the leadframe 16 to which the conductors 48 can be bonded using known wire bonding techniques. The portion of each terminal blade 28 and 30 which extends into the recess 14 of the housing 12 forms a wire bond site 44 which corresponds with a wire bond site provided on the microaccelerometer 18 or the signal processing circuitry 20. As noted above, a wire bond site is also provided on the microaccelerometer 18 and the signal processing circuitry 20 to allow their grounding with conductors 48 to the ground bond site 50 formed on the backplate 24. The microaccelerometer 18 and the signal processing circuitry 20 are then ground through the braces 26 to the circuit board (not shown) to which the package 10 is mounted.

As is known to those skilled in the art, the wire bonding process attaches one end of each conductor 48 to a bond site formed on the microaccelerometer 18 or the signal conditioning circuitry 20, or one of the corresponding bond sites 44 or 50, and then dispenses the conductor 48 as it travels to the corresponding wire bond site where it secures the opposite end of the conductor 48. Preferably, the wire bond sites 44 and 50 are provided with a soft gold plating in accordance with known plating methods so as to allow the use of gold wire for the conductors 48. However, other precious metals such as silver or palladium could be used instead of gold as the plating metal for the wire bond sites 44 and 50. In addition, aluminum wire conductors could be used instead of the gold wire conductors 48, which would make unnecessary the use of soft gold or other precious metals as the plating material at the wire bond sites 44 and 50. Those skilled in the art will also recognize that metal cladding methods could be employed to form the wire bond sites 44 and 50 instead of a plating method.

The housing 12 can be formed by overmolding the leadframe 16 in a conventional manner to form the housing and frame assembly 38 shown in FIG. 3. As shown in FIG. 4, the flange 34 is embedded within a wall 32 of the housing 12, while the terminal blades 28 and 30 project through an opposite wall of the housing 12. To complete the assembly of the accelerometer package 10 shown in FIG. 1, the microaccelerometer 18 and the signal processing circuitry 20 are secured in place on the backplate 24, preferably with a suitable adhesive, such as a silicone adhesive, for example Dow Corning's HIPEC SDA 6501, which will remain relatively soft and therefore will transmit little packaging stress to the microaccelerometer 18 and the signal processing circuitry 20. The microaccelerometer 18 is adhered to the weld button 52 (if present on the backplate 24), such that the microaccelerometer 18 is spaced above the backplate 24. The semiconductor signal processing circuitry 20 is positioned on the backplate 24 and permanently secured thereto with the preferred adhesive.

The conductors 48 are then appropriately formed to electrically interconnect the microaccelerometer 18, the signal processing circuitry 20, and the wire bond sites 44 and 50. The recess 14 in the housing 12 is then filled with a very soft dielectric passivation gel (not shown), preferably a UV-curable silicone gel, such as Dow Corning's 3-6371, to protect both the microaccelerometer 18 and the signal processing circuitry 20. The gel is very compliant for purposes of minimizing stresses transferred from the housing 12 as well as minimizing stresses due to thermal expansion and contraction of the gel in relation to the internal components of the microaccelerometer package 10. An air gap of approximately one millimeter is left between the cover 22 and the gel to provide for thermal expansion and the like. The cover 22 is preferably attached to the housing 12 so as to provide complete adhesive contact along and between the entire perimeters of the cover 22 and the housing 12. In a preferred embodiment, the cover 22 is a mylar label having a thickness of about 0.1 to about 0.3 millimeter, with a front surface printed with part identification and date code information, and a back surface coated with an acrylic pressure sensitive adhesive for bonding the cover 22 to the housing 12. Finally, the braces 26 and blade terminals 28 and 30 are trimmed from the frame 42 of the leadframe 16, and the braces 26 are bent roughly perpendicular to the housing 12, to achieve the package 10 illustrated in FIG. 1. Thereafter, the offset and gain of the signal processing circuitry 20 can be calibrated through the programming terminal blades 28, and diagnostic testing of the accelerometer package 10 can be conducted through the input/output terminal blades 30.

From the above it can be seen that a significant advantage of the present invention is that both the microaccelerometer 18 and the signal processing circuitry 20 are enclosed within a microaccelerometer package 10 which can be readily manufactured to be small, light weight and relatively inexpensive, yet is also very rigid and capable of isolating the microaccelerometer 18 from extraneous vibrations. Advantageously, the rigidity of the package 10 is determined primarily by the housing 12 and particularly the leadframe 16 which forms the backplate 24, braces 26 and terminal blades 28 and 30 of the package 10. Accordingly, there is no requirement to assemble additional structural components which would otherwise undesirably contribute to the size of the microaccelerometer package 10, as well as complicate the assembly of the package 10 and increase its assembly cost. Consequently, the microaccelerometer package 10 is highly suitable for use in automotive applications, such as supplemental inflatable restraint systems, anti-lock braking systems, active suspension systems, or seat belt lock-up systems, in which both sensing precision and minimal package size are highly desirable.

The present invention achieves the above with the use of the leadframe 16, which serves a dual role by forming the terminal blades 28 and 30 by which the output of the microaccelerometer 18 and signal conditioning circuitry 20 is transmitted from the microaccelerometer package 10 to its associated vehicle system, and by forming an integral structural member of the package 10 which significantly increases the rigidity of the package 10, and therefore the accuracy and reliability of the output signal. The rigidity of the package 10 is particularly enhanced because the leadframe 16 is formed from metal. Thus, the backplate 24 and the braces 26 are extremely rigid and strong, with additional improvements in strength and rigidity being made possible by forming ribs 36 in the braces 26 and embedding the flange 34 in the housing 12. In addition, because the braces 26 are made from an electrically conductive metal, they are also able to serve as an electrical ground for the package 10.

Another distinct advantage of the present invention is that the package 10 substantially isolates the microaccelerometer 18 and the signal processing circuitry 20 from package-induced stresses. Both the microaccelerometer 18 and the signal processing circuitry 20 are adhered to the backplate 24 with a soft adhesive which will transmit little packaging stress to the microaccelerometer 18 and the signal processing circuitry 20. Further isolation of the microaccelerometer 18 is achieved by placing the microaccelerometer 18 on a pedestal, such as the weld button 52. Finally, the package 10 is filled with a very soft silicone gel which further isolates the microaccelerometer 18 and the signal processing circuitry 20 from the environment within the package 10.

The above structural characteristics minimize the ability of extraneous vibrations and mechanical stresses to develop and become amplified in the vicinity of the microaccelerometer 18, such that the micro-machined accelerometer responds almost exclusively to the vehicle dynamics associated with acceleration and deceleration of the automobile. Other advantages of this invention are that the short distances between the wire bonding sites 44 and 50 and the microaccelerometer 16 and signal processing circuitry 20 facilitate automated wire bonding procedures employed for forming and attaching the conductors 48, and the signal processing circuitry 20 can be calibrated after the package 10 has been completed through the programming terminal blades 28. Such an advantage allows for "on chip" calibration of offset and gain for the purpose of correcting any signal output errors resulting from manufacturing and processing of the individual elements of both the signal processing circuitry 20 and the microaccelerometer 18 due to tolerances and thermal or mechanically induced stresses.

While our invention has been described in terms of a preferred embodiment, it is apparent that other forms of the device could be adopted by one skilled in the art. For example, the teachings of this invention could be used with modified or alternative materials, or with modified processing parameters. Furthermore, those skilled in the art will appreciate that the geometry, size and shape of the leadframe 16 and the housing 12 could differ considerably from that shown, and still achieve vibrational and mechanical stress isolation for the microaccelerometer 18 and the signal processing circuitry 20. Accordingly, the scope of our invention is to be limited only by the following claims.

The embodiments of this invention in which an exclusive property or privilege is claimed are defined as follows:

1. An accelerometer assembly comprising:

a unitary metal leadframe including a flat backplate defining a mounting plane for an acceleration sensor and circuit, a pair of brace elements extending from opposing sides of said backplate, and an electrical terminal having a first end disposed in proximity to said backplate, said acceleration sensor and circuit being mounted on said backplate and electrically coupled to said first end of said electrical terminal;

a plastic housing overmolded on said backplate such that said acceleration sensor and circuit and the first end of said terminal are disposed within a central cavity of said housing, and such that said brace elements and a second end of said electrical terminal protrude through said plastic housing; and said brace elements being bent substantially perpendicular to said mounting plane defined by said backplate so as to form a circuit board mount for said accelerometer assembly.

2. An accelerometer assembly as set forth in claim 1, wherein a ground terminal of said acceleration sensor and circuit is electrically coupled to said backplate so that said acceleration sensor and circuit are electrically grounded to a circuit board through said brace elements.

3. An accelerometer assembly as set forth in claim 1, wherein said backplate includes an integral metal flange extending substantially perpendicular to said mounting plane defined by said backplate and disposed within a peripheral wall of said plastic housing so as to anchor said metal leadframe to said plastic housing.

* * * * *